United States Patent Office 3,789,017
Patented Jan. 29, 1974

3,789,017
OXIDATIVE DEHYDROGENATION CATALYSTS
Darrell W. Walker, Bartlesville, Okla., assignor to Phillips Petroleum Company
No Drawing. Filed May 6, 1971, Ser. No. 140,970
Int. Cl. B01j 11/82
U.S. Cl. 252—437          7 Claims

ABSTRACT OF THE DISCLOSURE

Oxidative dehydrogenation catalyst comprising at least one metal selected from the group consisting of nickel, cobalt or iron in combination with tin, phosphorus, combined oxygen and, optionally, an alkali metal material, is substantially improved by impregnating such catalysts with additional tin.

---

The present invention relates to chemical compositions. More particularly, the invention relates to catalyst compositions, their preparation and the catalytic processes employing such compositions, e.g., processes for effecting the dehydrogenation of hydrocarbons.

Thermal noncatalytic and catalytic processes for converting organic compounds to compounds having a higher degree of unsaturation are known. The former are characterized by undesirable side reactions, low order of conversion and yields and poor selectivity to desired product. The catalytic processes are characterized by the particular catalytic material employed and the conditions under which the processes are operated, e.g., in the absence or presence of oxygen. While a number of such catalytic processes have attained some measure of commercial success, there is a continuing search for better catalytic materials which exhibit the high activity, high yields to desired product, high selectivity to desired product, extended longevity, high response to regeneration, especially in the presence of air, and which keep undesirable side reactions to a minimum; all characteristics of good dehydrogenation catalysts. The vexatious problem constantly faced by those skilled in the art is the identification and characterization of the compositions which are highly efficient dehydrogenation catalysts.

Among the more recently disclosed oxidative dehydrogenation catalysts are those which include halogens or halogen-releasing materials. Such catalysts exhibit many disadvantages in regard to equipment corrosion and expense of continuously feeding, recovering and recycling the relatively expensive halogen materials. Halogen-free catalytic materials continue to be the most desirable for use in dehydrogenation processes.

A recently discovered catalytic material which has been found useful for the oxidative dehydrogenation of organic compounds is one comprising a combination of at least one of nickel, cobalt or iron in association with tin, phosphorus and combined oxygen. Such a catalyst, for example, a Ni/Sn/P/O composition, has been found to be effective for converting paraffins, such as butane, to useful olefins and diolefins such as butenes and butadiene. For simplicity, the nickel, cobalt and iron group is referred to as the ferrous metals of Group VIII, or merely as the ferrous metals. The elements contained in the catalyst are not necessarily in the elemental state but can be combined with sufficient oxygen to form one or more neutral compounds such as nickel stannate, cobalt phosphate, iron stannate, nickel oxide, iron oxide, etc., depending upon the proportions of the elements present. Such catalysts generally have compositions such as shown in the following table:

| Element | Weight percent | |
|---|---|---|
| | Broad | Preferred |
| Ferrous metal | 26–75 | 30–45 |
| Tin | 1–50 | 14–35 |
| Phosphorus | 0.5–10 | 2–6 |

The percentages shown in the table above are based on the total weight of the catalyst composition, and the difference between the total weights of the above-named elements and 100 percent is made up by its combined oxygen content in an amount sufficient to satisfy the valences of each of the elements in the catalyst.

It has now been discovered that the above-described ferrous metal/tin/phosphorus/oxygen catalyst can be still further improved, particularly in its ability to maintain a high selectivity to desired products over a long period of time, by subjecting the catalyst to an additional treatment in which 0.1–10, preferably 1–5, weight percent of additional tin is deposited on the catalyst by impregnation. Thus, tin is introduced into the invention catalyst in two increments: The bulk of the tin is first associated with suitable ferrous metal compounds and suitable phosphorus compounds to the point where it is formed in the desired physical shape and calcined; then the calcined ferrous metal/tin/phosphorus/oxygen catalyst is given a final impregnation with a suitable tin compound to provide the activity-stabilizing benefits. After this final impregnation, the improved catalyst is again calcined at elevated temperatures in an oxygen-containing gas.

The ferrous metal/tin/phosphorus/oxygen catalyst compositions which are subjected to the impregnation step according to the present invention can be prepared by any suitable method. Conventional methods, such as coprecipitation, impregnation, or dry mixing, can be used. In general, any method can be used which will provide a composition containing the above-described elements in the above-described proportions and which will have a catalytic surface area of at least one square meter per gram. Thus, a ferrous metal compound, a tin compound and a phosphorus compound can be combined in any suitable way. Substantially any ferrous metal, tin and phosphorus compound can be employed in the preparation so long as none of the compounds are detrimental to the final oxidative dehydrogenation catalyst and so long as other elements in the preparation compounds are substantially removed from the final catalyst composition by prior washing or by volatilization. In some instances, however, small amounts of some of these other elements, which are involved in the preparation of the catalyst, can be tolerated in the final catalytic composition. For example, if a sulfate such as nickel sulfate or tin sulfate is employed in the preparation, small residual amounts of sulfur can be tolerated. Similarly, the presence of minor amounts of alkali metals, such as potassium, sodium and the like, can be tolerated and can also be found beneficial in some instances. Moreover, minor amounts of arsenic can sometimes be advantageous when included in the catalyst composition. Generally, however, the preferred ferrous metal, tin, and phosphorus compounds are either the oxides of these elements or compounds convertible to the oxide on calcination. Some examples of these are nickel nitrate, cobalt acetate, iron oxide, phosphoric acid, nickel stannate, ammonium phosphate, and the like, including mixtures thereof.

In one suitable method of catalyst preparation, suitable ferrous metal compounds are coprecipitated with suitable tin compounds by mixing solutions of these compounds. The coprecipitation can be aided by the addition of an inorganic base such as an alkali metal or alkaline earth metal hydroxide to maintain the pH of the mixture above about 7. The precipitate is then filtered, washed of any extraneous ions, and then, either before or after drying, impregnated with a suitable phosphorus-containing compound such as phosphoric acid. This composite is then activated by calcination in an oxygen-containing gas such as air at a temperature of 900–1800° F. for 1–24 hours or until the catalyst has activity for oxidative dehydrogenation. The solid catalyst composition can be conventionally formed in any conventional shape or form such as tablets, extrudates, granules, powder, agglomerates and the like.

These compositions can also be supported on or diluted with conventional carrier materials such as silica, alumina, boria, magnesia, titania, zirconia, and combinations thereof, as well as other similar conventional carrier materials.

The above-described ferrous metal/tin/phosphorus/oxygen catalyst is then, according to the present invention, impregnated with an additional activity-stabilizing amount of tin using any suitable impregnation method known in the catalyst art. Generally, speaking, a solution containing a soluble tin compound is contacted with the catalyst under conditions such that the desired amount of tin-containing liquid is absorbed by the catalyst. The catalyst is then dried and calcined as previously, in an oxygen-containing gas such as air, or merely subjected to the high temperature and oxygen-containing conditions of the oxidative dehydrogenation reaction zone.

Suitable tin compounds for impregnation are those compounds which are convertible to the oxide on calcination such as tin oxalate, tin tartrate, and the like. Also suitable are other tin compounds which do not leave undesirable residues on the catalyst. As mentioned above, minor amounts of sulfur residue on the catalyst are tolerable and, thus, tin compounds such as tin sulfate are satisfactory. Although less economical, nonaqueous solutions containing organo soluble compounds, for example, tetraphenyltin, can also be used for the impregnation. Because halogen residues are generally considered objectionable, tin halides are not preferred impregnating compounds.

Following impregnatiton, the tin-treated composite can be dried at temperatures in the range of 100° to about 400° F. and/or preferably calcined at temperatures of 800 to 1200° F. or higher, e.g., 1800 to 2500° F.

The thus-modified tin-impregnated catalysts have been found to be particularly useful for the oxidative dehydrogenation of hydrocarbon feedstocks having from about 2 to about 12 carbon atoms per molecule and at least one

grouping, i.e., adjacent carbon atoms having at least one hydrogen atom on each carbon. Such compounds can be branched or unbranched and include paraffins as well as monoolefins, but paraffins are presently preferred. The conversion of butane to 1,3-butadiene has been found particularly advantageous by the processes of the invention using these tin-modified catalysts. Some specific examples of other feeds include ethane, propane, isobutane, pentane, isopentane, hexane, 2-methylhexane, octane, 2,4-dimethyloctane, butene-2, 2-methylbutene-1, hexene-2, octene-1, 3-methylnoneen-4, dodecene-1, and the like, including mixtures thereof. The conversion products are valuable compounds particularly useful as intermediates for the preparation of polymeric materials such as synthetic rubbers and the like.

The hydrocarbon feedstocks can be dehydrogenated according to the processes and with the modified catalysts of the present invention at temperatures in the range of from about 800 to about 1200° F., preferably from about 950 to about 1150° F., at any convenient pressure such as from about 7 to about 250 p.s.i.a., and and at a hydrocarbon:oxygen ratio of from about 1:0.5 to about 1:4. The presence of steam is frequently beneficial and steam:hydrocarbon ratios up to about 50:1 can be used. The hydrocarbon feed rate will generally be in the range of from about 50 to about 5,000 GHSV. The fixed catalyst bed is the preferred mode of contact, but other modes, such as the fluidized bed, can also be used.

The dehydrogenation processes of this invention are ordinarily carried out by forming a mixture, preferably a preheated mixture, of the hydrocarbon feed, the oxygen-containing gas and the steam (if used) and passing this mixture over the catalyst at the desired temperature. The effluent from the reaction zone is subjected to any suitable separation method to isolate and recover the desired product. Unconverted feeds or partially converted materials can be recycled.

Generally, at least trace amounts of oxygenated products are also formed in these reactions. For example, compounds such as furan, acetaldehyde, furfural and acetic acid can be obtained. Some carbon oxides will be formed, as well as some cracking products.

The catalytic materials of the invention can operate for extended periods before regeneration is required. However, if and when such regeneration is required, this can be accomplished readily by simply stopping the flow of hydrocarbon feed. Contact of the catalytic material with air and steam can be maintained at process operating conditions until activity of the catalyst is restored.

The invention can be illustrated by the following examples.

EXAMPLE I

Preparation of Catalysts

A Ni/Sn/P/O catalyst was prepared by preparing separate aqueous solutions of 1160 g. $NiNO_3 \cdot 6H_2O$, 400 g. $K_2SnO_3 \cdot 3H_2O$, and 289 g. KOH (85 percent). The three solutions were then added, simultaneously and dropwise, into a stirred container of water while maintaining a pH of about 8–9. The resulting wet gel was filtered and washed sufficiently with distilled water to reduce the potassium content to the desired level. The wet gel was then intimately mixed with an aqueous solution containing 62 g. of $H_3PO_4$ (85 percent). The mixture was then dried at 220° F., calcined at 1100° F. for 3 hours, then crushed and screened to a 20–40 mesh size. The Ni/Sn/P/O composition contained 42% Ni, 27% Sn, 3.1% P, and 0.63% K, by weight. It had a surface area of 155 m.²/g.

A 5 g. portion of the above material was impregnated with an additional 2.5 weight percent Sn by slurrying with 10 cc. of an aqueous solution containing 0.225 g. $SnSO_4$. It was then dried at 220° F. and calcined at 1100° F. for 3 hours.

As a control, still another 5 g. portion of the above Ni/Sn/P/O composition was mixed with 10 cc. of water containing no impregnant. It was also dried at 220° F. and calcined 3 hours at 1100° F.

EXAMPLE II

Oxidative Dehydrogenation of Butane

Each of the two catalysts prepared in Example I was used in the oxidative dehydrogenation of butane in separate runs. The runs were carried out in a fixed bed reactor at 1100° F. and at atmospheric pressure. The space rates for the butane, oxygen and steam were 500, 530 and 5,000, respectively. The effluent was sampled after 18 hours and again after 65 hours. The results of these runs are shown in Table I.

TABLE I.—OXIDATIVE DEHYDROGENATION OF BUTANE

| | Catalyst | | | |
|---|---|---|---|---|
| | Ni/Sn/P/O (with additional 2.5% Sn) | | Ni/Sn/P/O (no additional Sn impregnation) | |
| On-stream, hrs | 18 | 65 | 18 | 65 |
| Conversion, percent | 40.5 | 39.3 | 41.8 | 40.0 |
| Yields, mol percent: | | | | |
| Butadiene | 19.6 | 18.8 | 19.7 | 16.8 |
| Butenes | 6.0 | 8.5 | 7.4 | 10.3 |
| Cracked | 4.1 | 4.0 | 5.0 | 5.1 |
| Oxidized | 10.9 | 8.1 | 9.7 | 7.9 |
| Modivity,[1] percent, to— | | | | |
| Butadiene | 48.4 | 47.7 | 47.2 | 42.0 |
| Butenes and butadiene | 63.1 | 69.4 | 65.0 | 67.7 |

[1] Modivity is a simplified selectivity based on analysis of gas phase products for converted hydrocarbons, oxides of carbon and unconverted feed. As reported herein, conversions and yields are on same basis as modivity.

The data in Table I show that over the on-stream period from 18 to 65 hours, there was a relatively small change in catalyst activity with the invention catalyst containing the small amount of additional impregnated tin. There was, however, a more substantial decrease in activity over this period with the noninvention catalyst. The decrease in activity was evident in the conversion, but particularly in the selectivity and yields to butadiene. These data show the activity-stabilizing effects of the invention catalyst and process.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A method for stabilizing a catalyst for the dehydrogenation of hydrocarbon feedstocks containing from 2 to 12 carbon atoms, said catalyst consisting essentially of from about 30 to about 45 weight percent, based on weight of catalyst, or at least one ferrous metal selected from the group consisting of nickel, cobalt and iron in association with from about 14 to about 35 weight percent, based on weight of catalyst, of tin and from about 2 to 6 weight percent, based on weight of catalyst, of phosphorus and wherein at least one of said ferrous metal, tin or said phosphorus is combined with oxygen; which method comprises treating a calcined catalyst having the described composition with a tin-containing material to impregnate said calcined catalyst with from about 0.1 to about 10 weight percent, based on weight of catalyst, of additional tin, and thereafter calcining said catalyst impregnated with additional tin.

2. A method of preparing an oxidative dehydrogenation catalyst which comprises:

forming a catalytic composite material consisting essentially of from about 30 to about 45 weight percent, based on weight of catalyst, of at least one ferrous metal selected from the group consisting of nickel, cobalt and iron in association with from about 14 to about 35 weight percent, based on weight of catalyst, of tin and from about 2 to about 6 weight percent, based on weight of catalyst, of phosphorus and wherein at least one of said ferrous metal, said tin or said phosphorus is combined with oxygen;

calcining said composite;

contacting said calcined catalytic composite material with a tin-containing material to impregnate said catalyst with 0.1 to 10 weight percent additional tin; and calcining said composite impregnated with additional tin.

3. A method according to claim 2 wherein the temperature at which said catalytic composite material is calcined is in the range of 900° to 1800° F.

4. A method according to claim 3 wherein said temperature at which said composite impregnated with additional tin is calcined is in the range of 900° to 1800° F.

5. An oxidative dehydrogenation catalyst prepared according to the method of claim 2.

6. A method according to claim 2 wherein said catalytic composite material contains 42 weight percent nickel, 27 weight percent tin, and 3.1 weight percent phosphorus, and wherein said calcined catalytic composite is impregnated with 2.5 weight percent additional tin.

7. A method of preparing an oxidative dehydrogenation catalyst which comprises:

forming a catalytic composite material consisting essentially of 42 weight percent nickel, 27 weight percent tin and 3.1 weight percent phosphorus, wherein at least one of said nickel, tin and phosphorus is combined with oxygen;

calcining said composite;

contacting said calcined catalytic composite with a tin-containing material to impregnate said catalyst with 2.5 weight percent additional tin; and calcining said composite impregnated with tin.

References Cited

UNITED STATES PATENTS

| 3,555,105 | 1/1971 | Nolan | 260—680 |
|---|---|---|---|
| 3,687,868 | 8/1972 | Pitzer | 252—435 |

PAUL M. COUGHLAN, JR., Primary Examiner

U.S. Cl. X.R.

260—680 E, 683.3